US008584009B2

(12) United States Patent
Ota et al.

(10) Patent No.: US 8,584,009 B2
(45) Date of Patent: Nov. 12, 2013

(54) AUTOMATICALLY PROPAGATING CHANGES IN DOCUMENT ACCESS RIGHTS FOR SUBORDINATE DOCUMENT COMPONENTS TO SUPERORDINATE DOCUMENT COMPONENTS

(75) Inventors: Hiroshi Ota, Saitama (JP); Masaki Tasaka, Tokyo (JP); Seiji Takahashi, Tokyo (JP); Yuichiro Sakuta, Kanagawa (JP); Hirohisa Saito, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 321 days.

(21) Appl. No.: 12/478,848

(22) Filed: Jun. 5, 2009

(65) Prior Publication Data
US 2009/0313539 A1 Dec. 17, 2009

(30) Foreign Application Priority Data
Jun. 13, 2008 (JP) .................................. 2008-155249

(51) Int. Cl.
*G06F 17/21* (2006.01)
*G06F 17/24* (2006.01)
*H04N 1/00* (2006.01)
*H04N 1/21* (2006.01)

(52) U.S. Cl.
USPC ........................... 715/255; 715/234; 715/713

(58) Field of Classification Search
USPC ........................ 715/255, 234, 713
See application file for complete search history.

(56) References Cited

U.S. PATENT DOCUMENTS

| 6,169,998 | B1 | 1/2001 | Iwasaki et al. | |
| 6,760,721 | B1 * | 7/2004 | Chasen et al. | 1/1 |
| 7,475,336 | B2 * | 1/2009 | Fujiwara | 715/230 |
| 7,844,139 | B2 * | 11/2010 | Iwasaki | 382/305 |
| 2006/0294051 | A1 * | 12/2006 | Kapadia et al. | 707/1 |
| 2007/0065045 | A1 * | 3/2007 | Iwasaki | 382/305 |
| 2007/0217678 | A1 * | 9/2007 | Kato | 382/180 |
| 2009/0113351 | A1 * | 4/2009 | Tomizawa et al. | 715/853 |

FOREIGN PATENT DOCUMENTS

| JP | 11-025113 | 1/1999 |
| JP | 2005-157461 | 6/2005 |
| JP | 2006-221569 | 8/2006 |

* cited by examiner

*Primary Examiner* — Doug Hutton, Jr.
*Assistant Examiner* — Ariel Mercado
(74) *Attorney, Agent, or Firm* — IPUSA, PLLC

(57) ABSTRACT

In one embodiment, components within different hierarchical document levels of a document have individual access rights and various hierarchical relationships with other components on different hierarchical levels within the document. Rules for automatically propagating changes in access rights for subordinate document components to superordinate document components are maintained. When an access right for a subordinate document component is changed, the change is automatically propagated to one or more superordinate document components, if permitted by the associated rules.

10 Claims, 17 Drawing Sheets

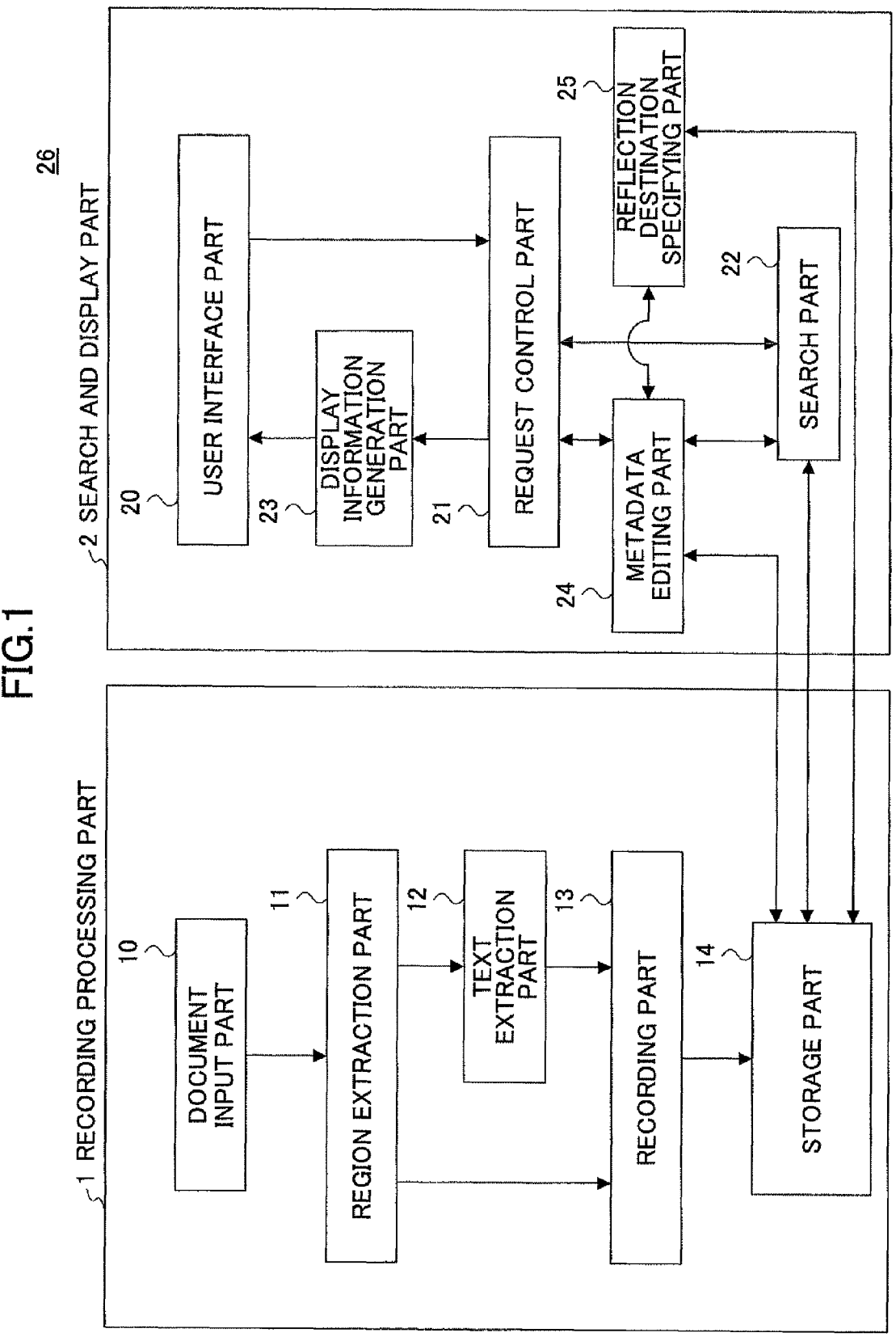

FIG.2A
31 ELECTRONIC DOCUMENT METADATA
[ELECTRONIC DOCUMENT ID] 0100
[REPOSITORY] repository/MyDoc.pdf
[PAGE NO.] 4
30 ELECTRONIC DOCUMENT
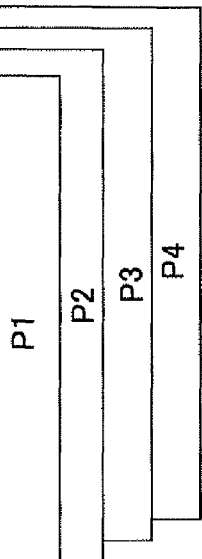
TABLE 1
| A | B | C |
|---|---|---|
| 1 | 2 | 3 |
abc......
FIG.1 http://www.xxx.co.jp
P1  P2  P3  P4
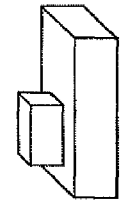
A

FIG.2C (B)

34 PARTIAL IMAGE DATA    35 PARTIAL IMAGE METADATA

| abc ---------- | [PARTIAL IMAGE ID] 0001<br>[REPOSITORY] repository/0001.pdf<br>[IMAGE TYPE] TEXT<br>[BELONGING INFORMATION]<br>\| ELECTRONIC DOCUMENT ID \| PAGE ID \|<br>\| 0100 \| 0010 \|<br>[COORDINATE INFORMATION] (10,10,200,100)<br>[KEY TEXT] abc ----------<br>[HYPERLINK] |
| --- | --- |
| \| A \| B \| C \|<br>\| 1 \| 2 \| 3 \| | [PARTIAL IMAGE ID] 0002<br>[REPOSITORY] repository/0002.pdf<br>[IMAGE TYPE] TABLE<br>[BELONGING INFORMATION]<br>\| ELECTRONIC DOCUMENT ID \| PAGE ID \|<br>\| 0100 \| 0010 \|<br>[COORDINATE INFORMATION] (50,100,90,60)<br>[KEY TEXT] TABLE 1<br>[HYPERLINK] |
| (diagram) | [PARTIAL IMAGE ID] 0003<br>[REPOSITORY] repository/0003.pdf<br>[IMAGE TYPE] DIAGRAM<br>[BELONGING INFORMATION]<br>\| ELECTRONIC DOCUMENT ID \| PAGE ID \|<br>\| 0100 \| 0010 \|<br>[COORDINATE INFORMATION] (40,150,100,50)<br>[KEY TEXT] FIG.1http://www.xxx.co.jp<br>[HYPERLINK] http://www.xxx.co.jp |

FIG.3

| DOCUMENT BOX | | |
|---|---|---|
| ☐ [SEARCH] <br><br>SELECTED DOCUMENT LIST <br>┌─────────────────────────────┐<br>│ 001 : aaa¥bbb¥ccc¥ DOCUMENT 001.pdf │<br>│ 002 : lll¥mmm¥nnn¥ DESIGN DATA │<br>│ 003 : sss¥ttt¥uuu¥ PROGRAM DATA │<br>│ . │<br>│ . │<br>└─────────────────────────────┘<br><br>《 1-10/20 DOCUMENTS 》 [NEXT] | | |
| DOCUMENT 1 | DOCUMENT 2 | DOCUMENT 3 |
| 40<br>┌─────────┬───┐<br>│ ABC │ │<br>├─────────┤ │<br>│ │ │<br>│ R │ │<br>│ │ │<br>├─────────┤ │<br>│abcdefghijkl│ │<br>│mnopqrstu│ │<br>└─────────┴───┘ |  | <Name>Resolution<br><Option>300dpi<br><PDL>RPCS</PDL><br><PDL>PS</PDL><br>    </Option> |
| DOCUMENT 4 | DOCUMENT 5 | DOCUMENT 6 |
|  |  |  |

FIG.9

| DATA | DATA ITEM | CHANGE-TIME REFLECTION DESTINATION | | |
|---|---|---|---|---|
| | | ELECTRONIC DOCUMENT | PAGE | PARTIAL IMAGE |
| ELECTRONIC DOCUMENT | ELECTRONIC DOCUMENT ID | − | × | × |
| | REPOSITORY | − | × | × |
| | ACCESS RIGHT | − | ○ | ○ |
| | SIGNATURE・ENCRYPTION DATA | − | ○ | ○ |
| | TAG | − | × | × |
| | AUTHENTICATION METHOD | − | ○ | ○ |
| | GROUND PATTERN INFORMATION | − | ○ | ○ |
| | IMAGE DATA | − | × | × |
| | TEXT DATA | − | × | × |
| | SUBORDINATE DOCUMENT ELEMENT LINK | − | ○ | ○ |
| PAGE | SUPERORDINATE DOCUMENT ELEMENT LINK | ○ | − | × |
| | PAGE ID | ○ | − | × |
| | IMAGE TYPE | ○ | − | × |
| | COORDINATE INFORMATION | ○ | − | ○ |
| | REPOSITORY | × | − | × |
| | ACCESS RIGHT | ○ | − | ○ |
| | SIGNATURE・ENCRYPTION DATA | ○ | − | ○ |
| | TAG | ○ | − | × |
| | AUTHENTICATION METHOD | ○ | − | ○ |
| | GROUND PATTERN INFORMATION | ○ | − | ○ |
| | IMAGE DATA | ○ | − | ○ |
| | TEXT DATA | ○ | − | ○ |
| | SUBORDINATE DOCUMENT ELEMENT LINK | × | − | ○ |
| PARTIAL IMAGE | SUPERORDINATE DOCUMENT ELEMENT LINK | × | ○ | − |
| | PARTIAL IMAGE ID | × | × | − |
| | IMAGE TYPE | × | × | − |
| | COORDINATE INFORMATION | × | ○ | − |
| | REPOSITORY | × | × | − |
| | ACCESS RIGHT | ○ | ○ | − |
| | SIGNATURE・ENCRYPTION DATA | ○ | ○ | − |
| | TAG | ○ | ○ | − |
| | AUTHENTICATION METHOD | ○ | ○ | − |
| | GROUND PATTERN INFORMATION | ○ | ○ | − |
| | IMAGE DATA | ○ | ○ | − |
| | TEXT DATA | ○ | ○ | − |

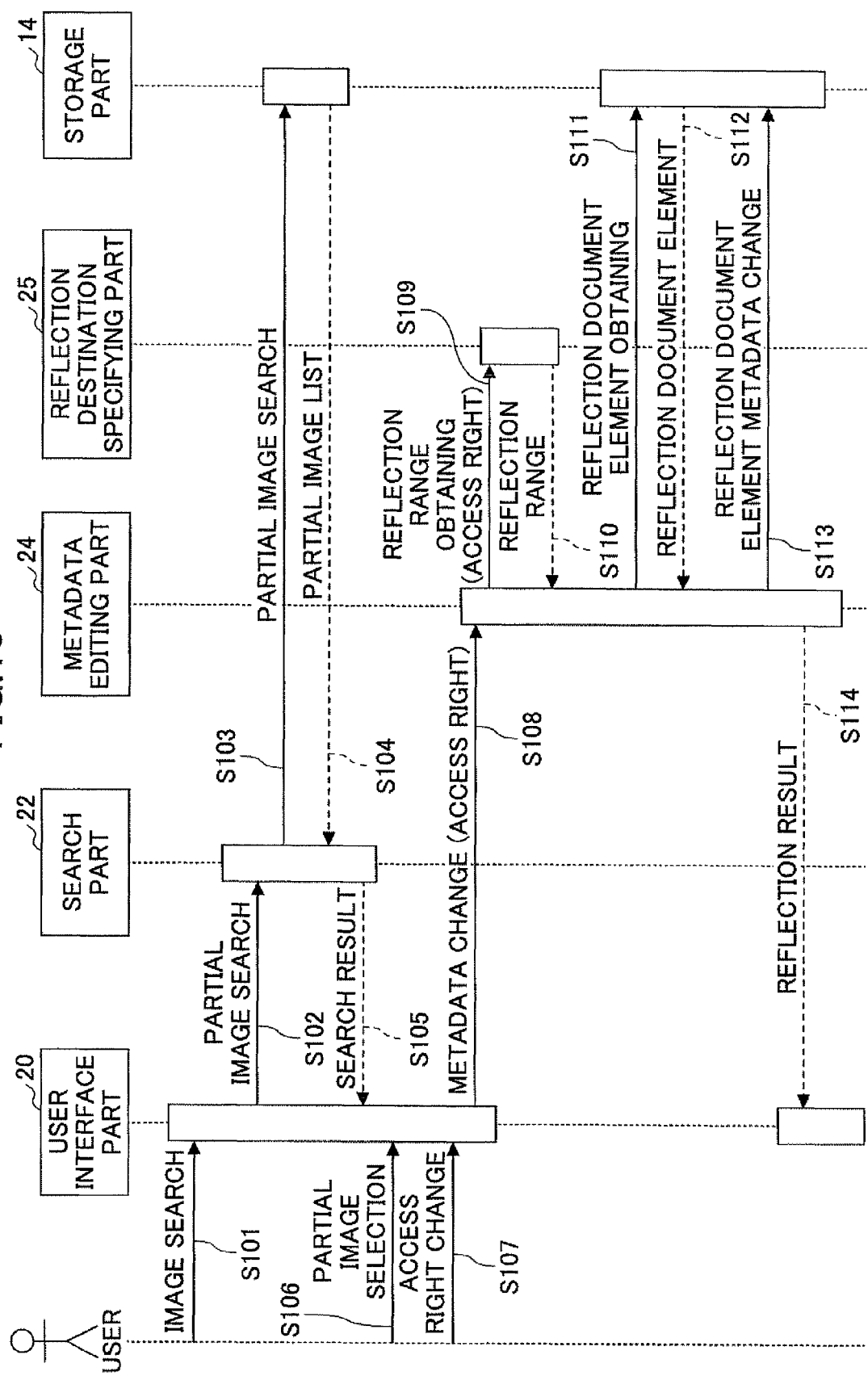

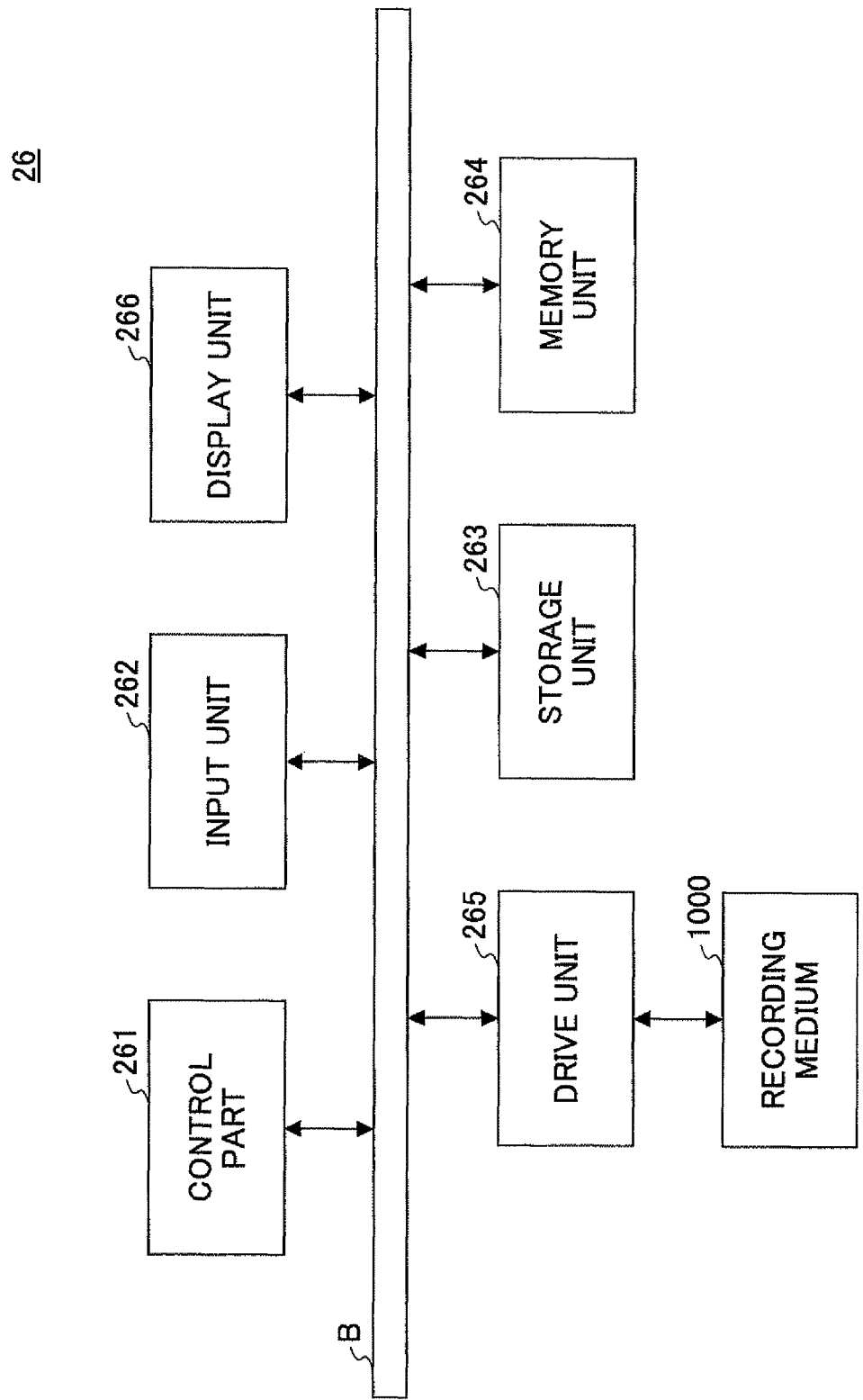

AUTOMATICALLY PROPAGATING CHANGES IN DOCUMENT ACCESS RIGHTS FOR SUBORDINATE DOCUMENT COMPONENTS TO SUPERORDINATE DOCUMENT COMPONENTS

CROSS-REFERENCE TO RELATED APPLICATION

The present application is based on Japanese Priority Patent Application No. 2008-155249, filed on Jun. 13, 2008, the entire contents of which are incorporated herein by reference.

BACKGROUND OF THE INVENTION

1. Field of the Invention

The present invention relates to an information processor and an information processing method for managing electronic information by providing the electronic information with its related data, or metadata, and to a computer-readable recording medium on which a program for causing a computer to execute the image processing method is recorded.

2. Description of the Related Art

As computers spread rapidly, it has become common to store a document, which is conventionally stored by filing paper, as electronic information.

For example, Japanese Laid-Open Patent Application No. 11-25113 discloses an information processor that recognizes and extracts an image region including an image and a character region including a character string from a document containing diagrams, tables, images such as photographs, and character strings; stores the extracted image as a search object; and facilitates a search for the stored image using the extracted characters (character string) as a text for search.

Such an information processor can retrieve necessary information from among a large amount of electronic information.

In the above-described information processor, not only a document but also individual images and texts forming the document are also stored as electronic information.

It is a common practice to provide, for example, electronic information as described above with its related data, or metadata. Provision of metadata to the electronic information facilitates its management. There is, however, a problem in that the editing of the metadata is time-consuming because it should be performed item by item manually by a user.

SUMMARY OF THE INVENTION

According to one aspect of the present invention, an information processor and an image processing method are provided that improve a user's working efficiency at the time of managing electronic information by providing it with its related data, or metadata.

According to one embodiment of the present invention, an information processor includes a storage part configured to store a plurality of hierarchically correlated data elements; a metadata storage part configured to store metadata of each of the data elements; an editing part configured to edit the metadata stored in the metadata storage part; and a reflection part configured to reflect a result of editing the metadata of one of the data elements by the editing part in the metadata of at least one of the remaining data elements.

According to one embodiment of the present invention, an information processor includes a storage part configured to correlate and store a first content and a second content; a metadata storage part configured to store metadata of the first and second contents; an editing part configured to edit the metadata stored in the metadata storage part; and a metadata update part configured to update the metadata of the first content based on a result of the editing of the metadata of the second content by the editing part.

According to one embodiment of the present invention, an information processing method includes the steps of: (a) storing a plurality of hierarchically correlated data elements; (b) storing metadata of each of the data elements; (c) editing the metadata stored in said step (b); and (d) reflecting a result of editing the metadata of one of the data elements in said step (c) in the metadata of at least one of the remaining data elements.

According to one embodiment of the present invention, a computer-readable recording medium has a program for causing a computer to execute the above-described information processing method recorded thereon.

BRIEF DESCRIPTION OF THE DRAWINGS

Other objects, features and advantages of the present invention will become more apparent from the following detailed description when read in conjunction with the accompanying drawings, in which:

FIG. 1 is a block diagram illustrating a functional configuration of an image processor according to an embodiment of the present invention;

FIGS. 2A, 2B, and 2C are diagrams illustrating information recorded in a storage part illustrated in FIG. 1 according to the embodiment of the present invention;

FIG. 3 is a diagram illustrating a screen that displays the document structure of an electronic document according to the embodiment of the present invention;

FIG. 9 is a diagram illustrating the case of causing selection of the reflection range of the metadata of the electronic document, page, and partial image according to the embodiment of the present invention;

FIG. 10 is a sequence diagram related to processing at the time of selecting a partial image on a user interface and changing its access right according to the embodiment of the present invention;

FIG. 15 is a block diagram illustrating a hardware configuration of the image processor according to the embodiment of the present invention.

DETAILED DESCRIPTION OF THE PREFERRED EMBODIMENTS

Figure 2B:
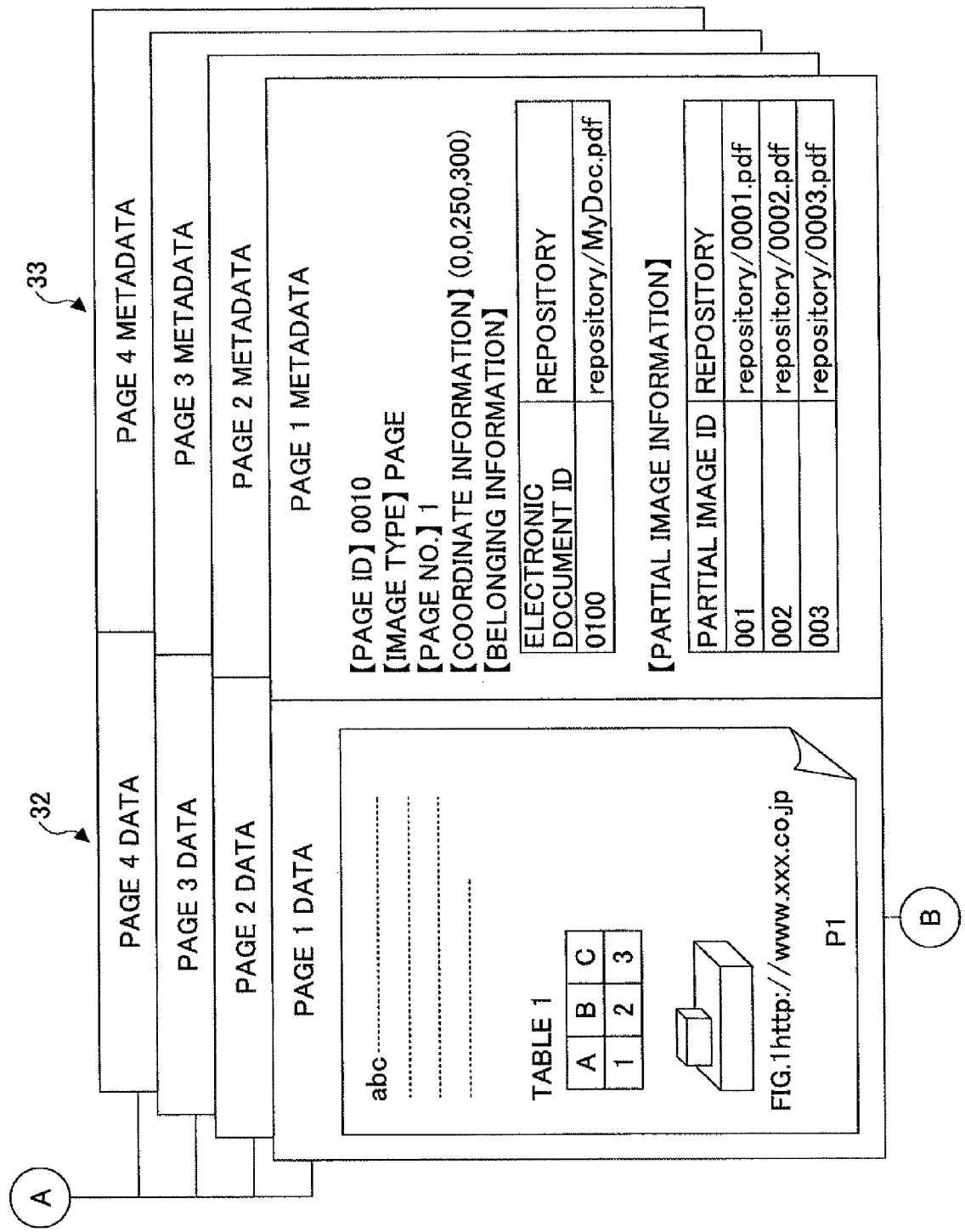

A description is given, with reference to the accompanying drawings, of an embodiment of the present invention.

FIG. 1 is a block diagram illustrating a functional configuration of an image processor 26 according to the embodiment of the present invention.

The image processor 26, which may be a general example of information processors such as personal computers, copiers, facsimile machines, and multifunction machines, extracts a diagram, a table, and text from a document as images, correlates the extracted images with a page of the document from which they have been extracted, and displays the structure of the document on, for example, a display unit 266 (FIG. 15). The extracted images are defined and referred to as "partial images." Data on the extracted or partial image may be referred to as "partial image data."

Referring to FIG. 1, the image processor 26 includes a recording processing part 1 and a search and display part 2. The recording processing part 1 includes a document input part 10, a region extraction part 11, a text extraction part 12, a recording part 13, and a storage part 14. The document input part 10 acquires electronic document data into which document data are digitized (computerized). The document input part 10 inputs or enters electronic document data such as those read from original material (such as a document) and digitized with a reader such as a scanner provided in the image processor 26, those created with word processing software provided in the image processor 26, and those received from another image processor connected to the image processor 26 via a telecommunications line or network.

The region extraction part 11 extracts, from page image data of the electronic document data (that is, the image data of a page of a document), the (partial) image data of an image region including the image of a diagram and/or a table and the (partial) image data of a character region including a character string (text). That is, the region extraction part 11 extracts data on a document element basis (document element by document element).

The text extraction part 12 recognizes characters with respect to a text or caption in the image data of the image region and the image data of the character region, and extracts the recognized text. The recording part 13 correlates the image data extracted in the region extraction part 11 with the corresponding text extracted in the text extraction part 12 and further with the page image data from which the image data have been extracted, and records or stores the data in the storage part 14, which may be a storage unit. Thus, the region extraction part 11 extracts data on a document element basis, and the text extraction part 12 extracts the data correlated with the data of individual document elements, or metadata.

The recording part 13 correlates the data on a document element extracted on a document element basis with the metadata of the document element, and records the data and corresponding metadata. The storage part 14, which is an example of a data storage part and a metadata storage part, stores electronic document data, page image data, partial image data, electronic document metadata, page image metadata, and partial image metadata. The storage part 14 includes, for example, a hard disk provided in the image processor 26. The storage part 14 may be provided external to the image processor 26.

The details of the data recorded by the recording part 13 are described below. The recording processing part 1 is configured to handle documents of any format, such as documents read with a scanner, documents created with word processing software, and structured documents including Standard Generalized Markup Language (SGML), Hypertext Markup Language (HTML), or Extensible Markup Language (XML).

The search and display part 2 includes a user interface part 20, a request control part 21, a search part 22, a display information generation part 23, a metadata editing part 24, and a reflection destination specifying part 25. The user interface part 20 includes an output (display) part configured to output or display information to a user and a reception part configured to receive a request from the user. Examples of the corresponding hardware of the user interface part 20 include a touch panel, a display plus a keyboard and/or mouse, and a liquid crystal display (LCD). The request control part 21 controls a flow of a series of operations from receiving a user's request to responding to the user's request.

Further, the user interface part 20 displays information generated in the display information generation part 23 as a response to the user's request controlled by the request control part 21. If a user wishes to edit the metadata of an electronic document, a page image, or a partial image contained in the storage part 24, the user requests the editing of the metadata through the user interface part 20.

The request for the editing of the metadata is received by the request control part 21. In responses the request control part 21 requests the metadata editing part 22 to edit the metadata. The metadata editing part edits the metadata contained in the storage part 14 based on the request. The user may specify the metadata to be edited directly by specifying a data item name and a document element related to the metadata to be edited or may search for or retrieve the metadata to be edited by specifying a keyword.

If the user specifies a keywords the request control part 21 provides the search part 22 with the keyword, and requests the search part 22 to conduct a search. The search part 22 searches the storage part 14 for corresponding metadata in accordance with the acquired (received) keyword. The request control part 21 passes a search result to the display information generation part 23. After conversion into display data by the display information generation part 23, the search result is displayed by the user interface part 20. For example, a screen is displayed on the user interface part 20 so as to allow the user to edit the metadata from this screen. For example, access right may correspond to the metadata to be edited.

If the metadata of any document element is edited by the metadata editing part 24, a reflection destination, where the editing result is to be reflected, or written or recorded, in the metadata of another document element, may be specified by the reflection destination specifying part 25. Then, the metadata editing part 24 further edits the metadata of the other document element, or the reflection destination specified in the reflection destination specifying part 25. The editing or updating of the metadata of another document element specified by the reflection destination specifying part by an editing part is referred to as "reflection" or "reflecting." The metadata editing part 24 is an example of the editing part configured to edit metadata.

[Description of Data Recorded in Storage Part]

FIGS. 2A, 2B, and 2C are diagrams illustrating information recorded in the storage part 14 by the recording part 13 illustrated in FIG. 1.

In the storage part 14, electronic document data 30, which are document data to be stored; electronic document metadata 31 associated with the electronic document data 30; page image data 32 forming the electronic document data 30; page image metadata 33 associated with the page image data 32; partial image data 34, which are the image data of image regions including images or character regions including character strings, extracted from the page image data 32 forming the electronic document data 30 on a page basis (page by page); and partial image metadata 35 associated with the partial image data 34 are correlated with each other and stored. FIG. 2A illustrates the electronic document data 30 and the electronic document metadata 31. FIG. 2B illustrates the page image data 32 and the page image metadata 33. FIG. 2C illustrates the partial image data 34 and the partial image metadata 35.

The electronic document metadata 31 (of an electronic document) include data such as an electronic document ID for uniquely identifying the corresponding electronic document data 30, repository information indicating the storage location of the electronic document data 30 in the storage part 14, and the number of pages indicating the number of pages forming the electronic document data 30.

The page image metadata 33 (of a page) include data such as a page ID for uniquely identifying the corresponding page image data 32, an image type indicating the type of the page image data 32, the number of the page, coordinate information for identifying the region of the page image data 32, belonging information for identifying the electronic document data 30 that contains the page image data 32, and partial image information (region image information) for identifying the image data of an image region or a character region extracted from the page image data 32.

It is assumed that the above-mentioned coordinate information is, for example, (x0, y0, x1, y1). In this case, x0, y0, x1, and y1 signify the upper left x-coordinate, the upper left y-coordinate, the lower right x-coordinate, and the lower right y-coordinate, respectively, of the image relative to the origin set in the page image data 32. In the case of the page image metadata 33, x0 and y0 are always zero (0).

The partial image metadata 35 (of a partial image, or the image of an image region or a character region) include data such as a partial image ID for uniquely identifying the image data of an image region or a character region (partial image data 34), repository information indicating the storage location of the partial image data 34 in the storage part 14, an image type indicating the type of the partial image data 34 (data for classifying image types into at least a text, table, and diagram), belonging (correlation) information for determining which page image data 32 of which electronic document data 30 the partial image data 34 are correlated with, coordinate information for identifying the region of the partial image data 34 in the corresponding page, a key text, or the character string information extracted from the partial image data 34, and a hyperlink recognized in the key text as link information. The partial image ID corresponds to an image partial image ID with respect to the image data of the image region and to a character partial image ID with respect to the image data of the character region.

[Description of Display]

Figure 4:
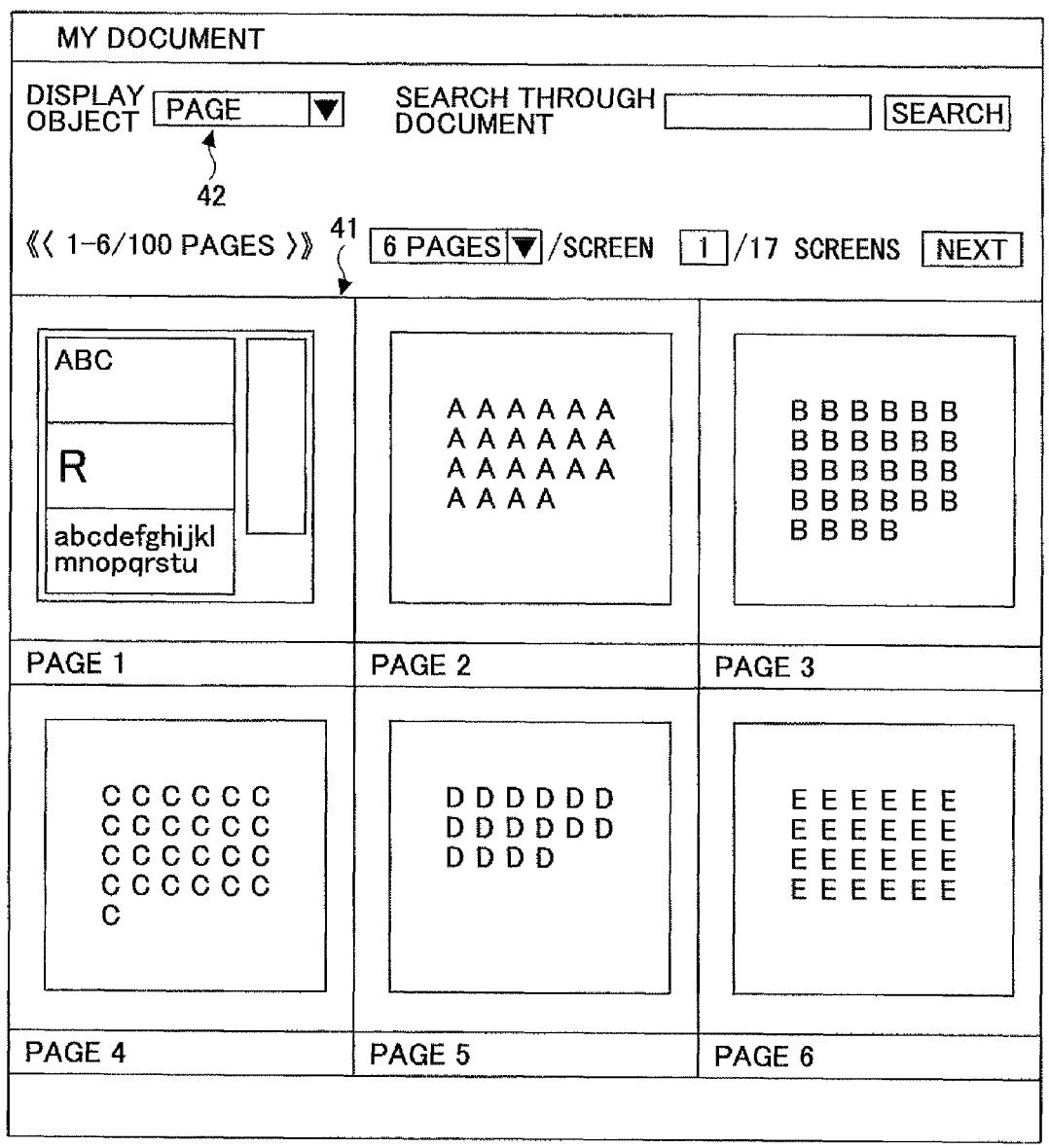
FIG. 4 is a diagram illustrating another screen that displays the document structure of the electronic document according to the embodiment of the present invention.
Figure 5:
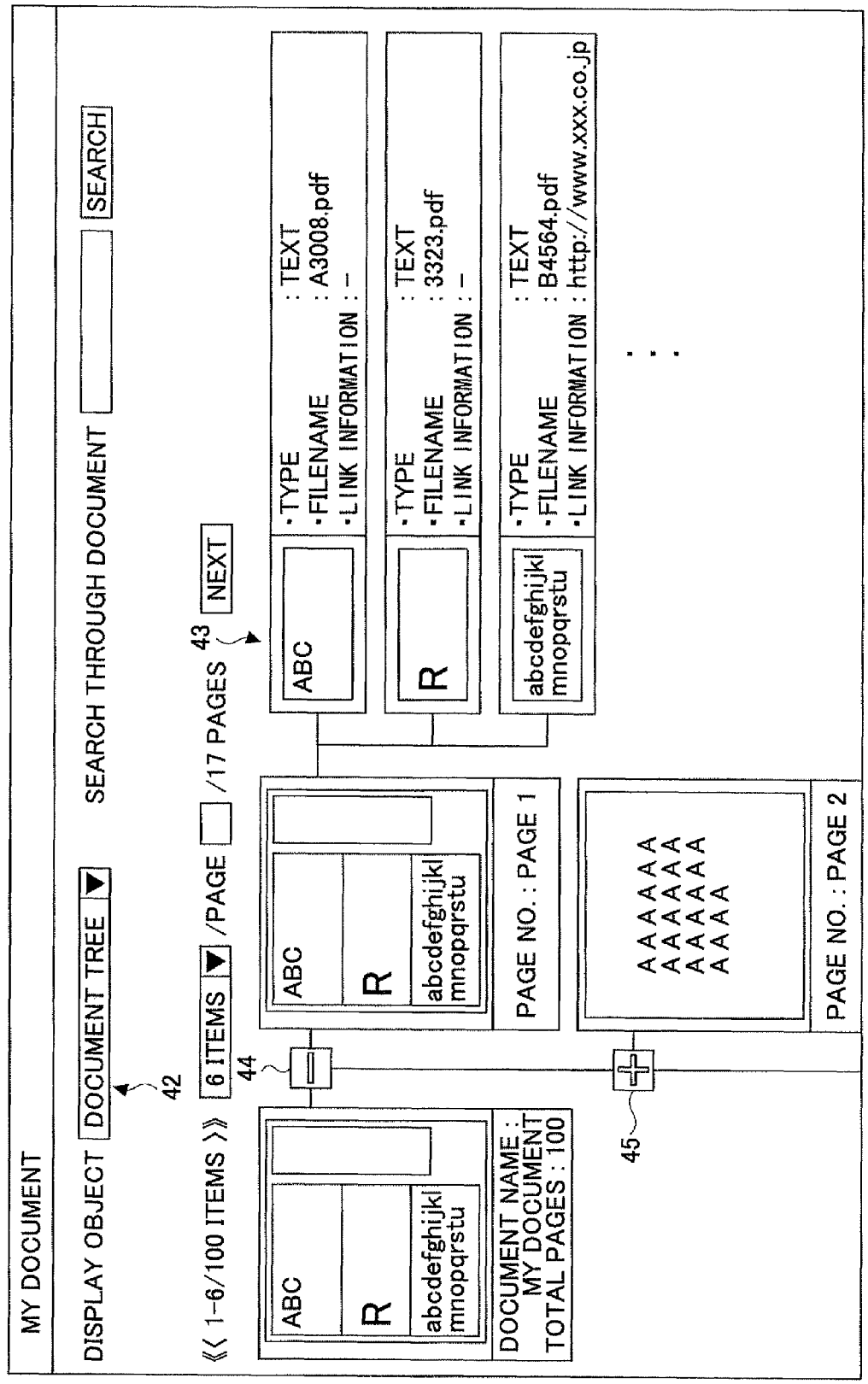
FIG. 5 is a diagram illustrating yet another screen that displays the document structure of the electronic document according to the embodiment of the present invention.

Next, a description is given, with reference to FIG. 3 through FIG. 5, of screens that display the document structure of an electronic document.

First, FIG. 3 illustrates a screen in the case of a user displaying a list of electronic documents retained in the storage part 14 through the search and display part 2. This screen allows a user to refer to a list of electronic documents retained in the storage part 14.

A thumbnail image displayed on this screen serves as a link to the list screen of the pages of a corresponding electronic document. The page list screen is displayed in response to a user clicking on the thumbnail image.

For example, in response to clicking on a thumbnail image 40 of an electronic document of FIG. 3, a page list screen is displayed as illustrated in FIG. 4. On this page list screen, the page images of the pages of the electronic document are displayed in a list 41 on a page basis. Since PAGE is specified in a display object field 42 on the page list screen, the page images of the electronic document are displayed in the list 41.

Here, if DOCUMENT TREE is specified in the display object field 42 on the page list screen, a page list screen as illustrated in FIG. 5 is displayed. On this page list screen, the electronic document, the page images of the pages of the electronic document, and partial images in the pages (on a page image basis or page image by page image) are displayed in a tree format 43.

[Description of Tree-Format Display]

As illustrated in FIG. 5, the tree format 43 showing the document structure of an electronic document includes three stages, so that the thumbnails and metadata of the electronic document, the page images of the electronic document data of the electronic document, and the page-by-page partial images are displayed from the left side of the screen in FIG. 5.

Here, the image of the first page of the electronic document is displayed as the electronic document. Alternatively, however, the image of the first page may be replaced with an icon or another image denoting a document so as to avoid redundancy because the image of the first page is equal to the first page of the page images. Further, part of the metadata (metadata items illustrated in FIGS. 2A through 2C) is displayed on the screen of FIG. 5. Alternatively, however, all metadata may be displayed. Further, the metadata added by a user may also be displayed.

Further, the images in the tree format 43 may be displayed in an expanded or collapsed manner. Unnecessary partial images may be omitted (collapsed) by clicking on an omission icon (− icon) 44 displayed on the tree. The omitted (collapsed) partial images may be expanded by clicking on an expansion icon (+ icon) 45. The omission icon 44 and the expansion icon 45 are not displayed for a page that has no partial image as a child (child node).

If the metadata of a partial image include a hyperlink for a URL or the like, displaying the hyperlink makes it possible to refer to a Web site on the Internet displaying a page to which the hyperlink is linked by jumping to the page when the displayed hyperlink is selected.

In this embodiment, it is assumed that a screen is displayed with HTML and the expansion and collapsing of partial images are controlled with JavaScript. (Java is a registered trademark.) However, means for implementation is not limited to this.

[Description of Displaying for Tree Formation]

Next, a description is given of processing for switching a page list screen to a document tree screen.

Figure 6:
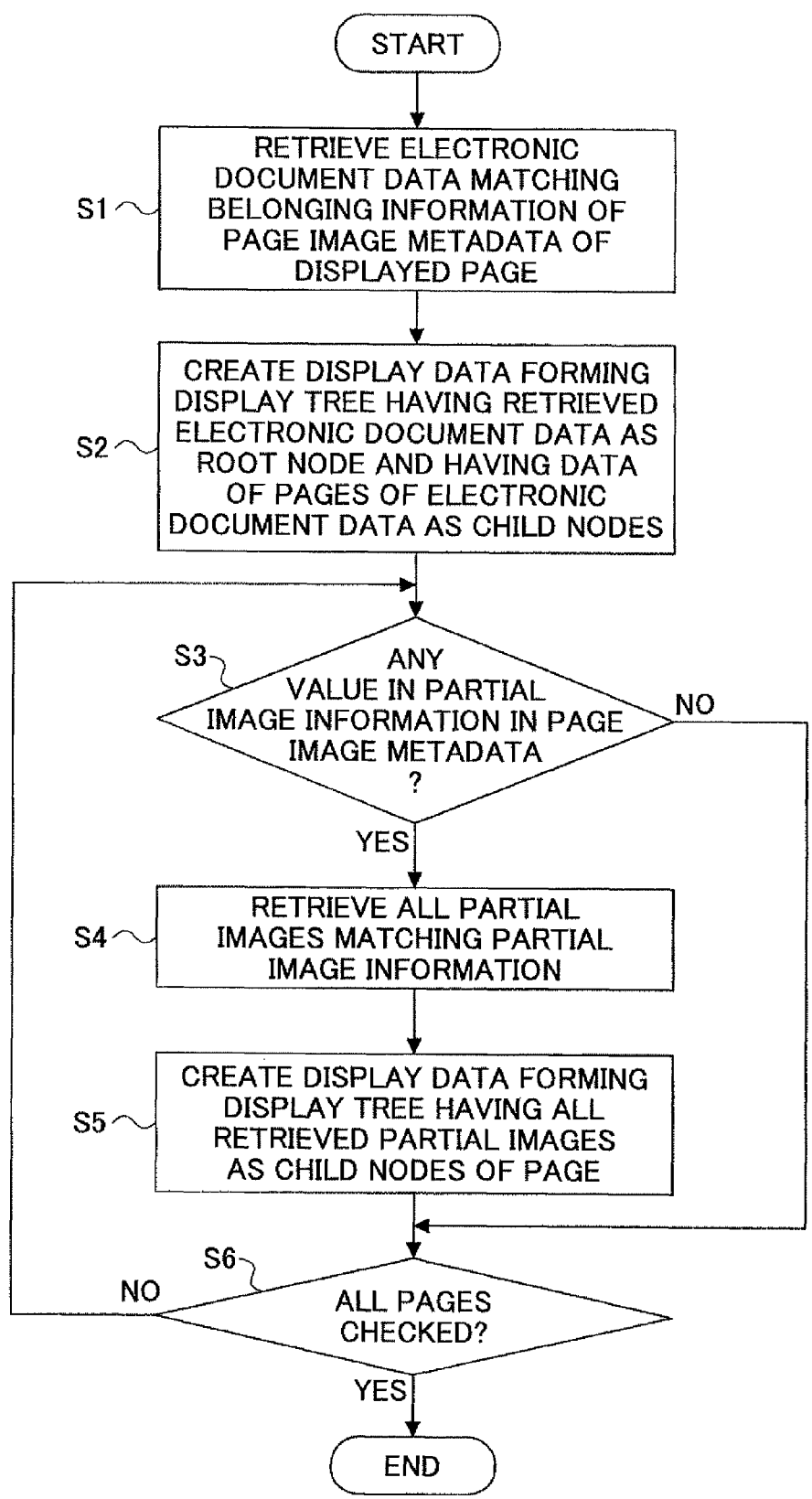
FIG. 6 is a flowchart illustrating processing at the time of switching a page list screen to a document tree screen according to the embodiment of the present invention.

FIG. 6 is a flowchart illustrating processing for switching a page list screen to a document tree screen.

With respect to the first page of the pages displayed in the page list illustrated in FIG. 4, for example, the belonging information of the first page, which is a metadata item of the first page, is referred to, so that an electronic document ID, which is information for identifying electronic document data to which the page belongs, and information on the repository of the corresponding electronic document are obtained. Therefore, in step S1 of FIG. 6, electronic document data that match the belonging information are searched for, or retrieved, based on the obtained information.

In step S2, with respect to the electronic document data retrieved by the search of step S1, the page image data are extracted from the electronic document data, and display data (data to be displayed) are created that form a display tree having the electronic document data as a root node and having the data of the pages extracted from the electronic document data as child nodes.

Next, in step S3, with respect to extracted page image metadata, it is determined whether there is a value in the partial image information (region image information) of the page image metadata. If it is determined in step S3 that there is no value in the partial image information (NO in step S3), the processing proceeds to step S6 without forming a tree because there is no partial image related to the page. On the other hand, if it is determined in step S3 that there is a value in the partial image information (YES in step 53), in step S4, the electronic document ID and partial image repository information for identifying one or more partial images extracted from the page image metadata are obtained in a list format, and the partial image data for the length of the list (the image data of image or character regions) are searched for based on the obtained information. In step S5, display data are created that form a display tree having the partial image data retrieved by the search of step S4 as the child nodes of the page.

Then, in step S6, it is determined whether each page has been checked. If it is determined that there is an unchecked page (NO in step S6), the processing returns to step S3 and the above-described processing is performed. If it is determined that all the pages have been checked, this processing ends.

Display data in a tree display format having an electronic document as a root node are created by the above-described processing. Then, by transmitting the display data to the user interface part 20, the document structure (the page configuration and the configuration of the image regions and/or character regions in each page) of the electronic document can be displayed in a tree format, so that a user can easily understand the document structure of the electronic document referring to the tree.

[Positions of Electronic Document, Page, and Partial Image]

Figure 7:
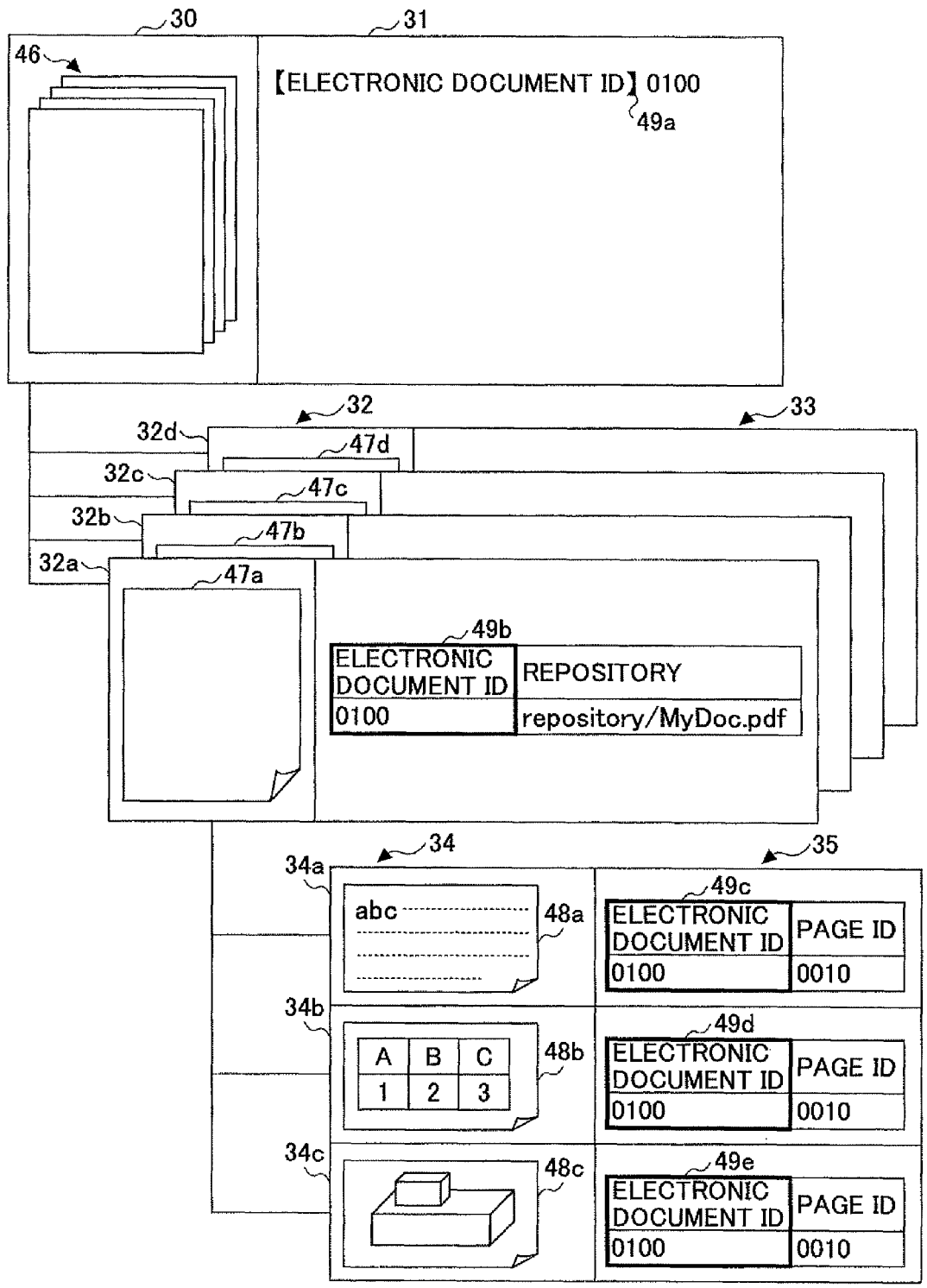
FIG. 7 is a diagram illustrating the positions of the electronic document, a page, and a partial image according to the embodiment of the present invention.

FIG. 7 is a conceptual diagram of information contained in the storage part 14, illustrating the positions of an electronic document, page, and partial image. In FIG. 7, the elements as those illustrated in FIGS. 2A through 2C are referred to by the same reference numerals, and the details of the elements of FIG. 7 are suitably omitted for convenience of graphical representation.

An electronic document 46 includes one or more pages, and each page includes one or more partial images. In the case illustrated in FIG. 7, the electronic document 46 includes four pages 47a through 47d, and the page 47a includes three partial images 48a through 48c.

The electronic document data 30, which are the data of the electronic document 46, include the data of the pages (47a through 47d) included in the electronic document 46 (page image data 32) and the data of the partial images included in the pages (partial image data 34). The page image data 32 are the page-by-page data of the electronic document 46. In FIG. 7, the page image data 32 include individual page image data 32a, 32b, 32c, and 32d, which are the data of the pages 47a, 47b, 47c, and 47d, respectively, of the electronic document 46.

Further, the page image data 32 of a page include the data of all of one or more partial images included in the page (partial image data 34). Referring to FIG. 7, the partial image data 34 include partial image data 34a, 34b, and 34c, each being the data of part of the page 47a. The partial image data 34a, 34b, and 34c are the data of partial images 48a, 48b, and 48c, respectively, of the page 47a.

Hereinafter, the electronic document data 30 may be referred to as "document element," the page image data 32a through 32d may be referred to collectively or individually as "document element," and the partial image data 34a through 34c may be referred to collectively or individually as "document element."

The electronic document data 30' the page image data 32, and the partial image data 34 are correlated with their respective metadata 31, 33, and 35 and contained in the storage part 14 with respect to each document element (on a document element basis).

Further, the contained metadata 31, 33, and 35 include identification information for identifying or determining the relationship between their corresponding document elements. For example, if the electronic document metadata 31, the page image metadata 33, and the partial image metadata 35 contain respective electronic document IDs 49a through 49e (which may hereinafter be referred to collectively as "electronic document ID 49), which is one type of identification information, in the storage part 14 as illustrated in FIG. 7, the document elements containing the same electronic document ID 49 are mutually related.

That is, the identification information is metadata that make it possible to identify the parent-child relationship of an electronic document, pages, and partial images of the same origin.

[Concepts of Superordinate Document Element, Subordinate Document Element, and Coordinate Document Element of Electronic Document Data, Page Image Data, Partial Image Data]

Figure 8:
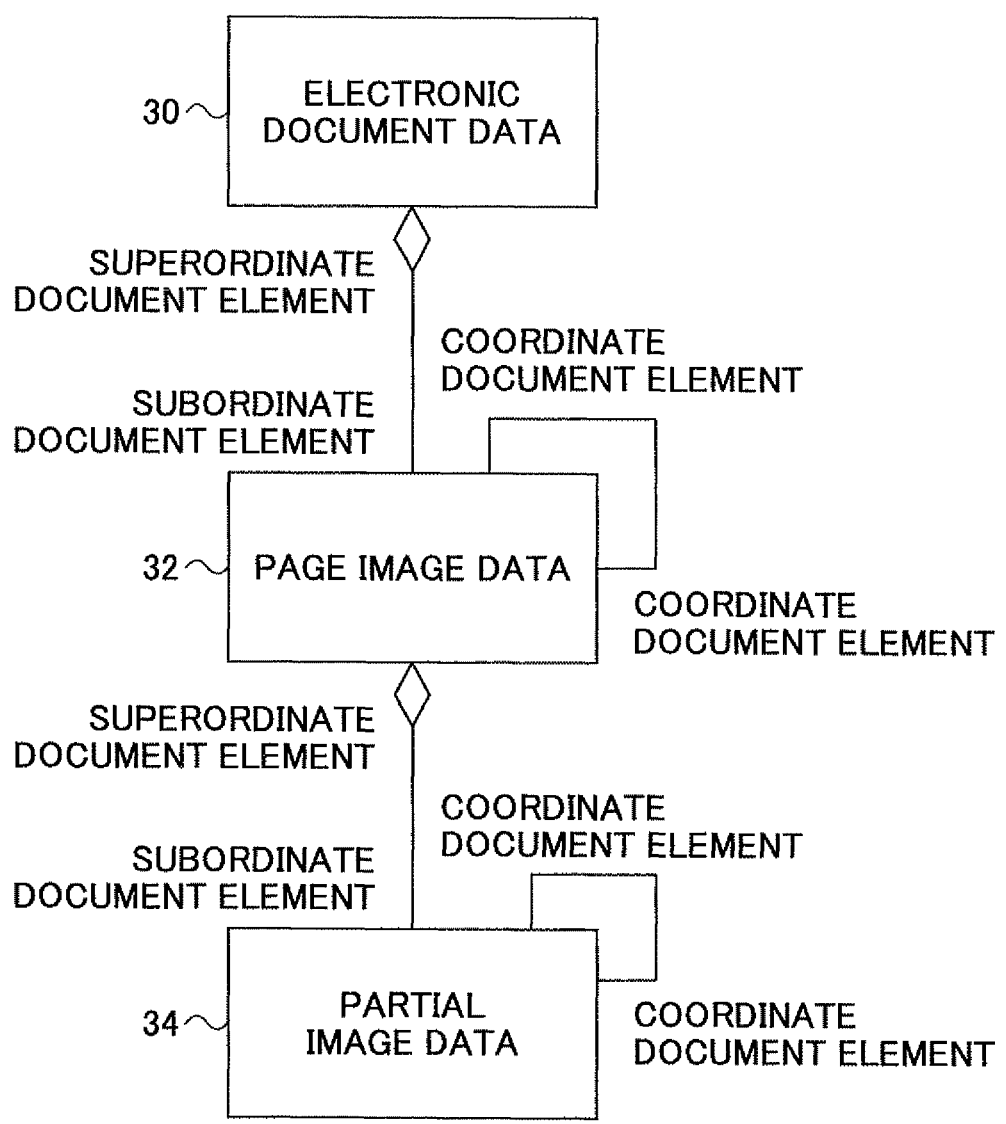
FIG. 8 is a diagram illustrating the concepts of a superordinate document element, subordinate document element, and coordinate document element of the electronic document, page, and partial image according to the embodiment of the present invention.

FIG. 8 is a diagram illustrating the concepts of a superordinate document element, subordinate document element, and coordinate document element of electronic document data, page image data, and partial image data.

The superordinate document element, the subordinate document element, and the coordinate document element are positions in related document elements. The identification information is information for identifying the relationship between document elements included in the data items of metadata. If the same identification information is contained in the electronic document metadata 31 (FIG. 7), the page image metadata 33 (FIG. 7), and the partial image metadata 35 (FIG. 7), the electronic document data 30, the page image data 32, and the partial image data 34 are related document elements.

Referring to FIG. 8, the page image data 32 and the partial image data 34 are document elements subordinate to the electronic document data 30. The partial image data 34 are a document element subordinate to the page image data 32.

On the other hand, the electronic document data 30 and the page image data 32 are document elements superordinate to the partial image data 34, and the electronic document data 30 are a document element superordinate to the page image data 32 and the partial image data 34.

Further, the individual page image data 32 are document elements coordinate with each other, and the individual partial image data 34 are document elements coordinate with each other. Here, a document element having a subordinate document element may be referred to as a parent element, and a document element having a superordinate document element may be referred to as a child element. These relationships may be referred to as "parent-child relationships."

[Examples of Metadata and Reflection Destination Specifying Table]

According to this embodiment, a user may edit metadata on a document element basis.

In the case where the value of a data item of metadata has been edited, it may be desirable to reflect (store) the result of the editing in the metadata of another document element if the data item is also included in the metadata of the other document element.

For example, it is assumed that the right of access to the page image data 32 is changed to prevent a certain user from referring to the page image data 32. In this case, unless this change to the access right is reflected in the right of access to the electronic document data 30, which are a superordinate document element including the page image data 32, the user can refer to the page image data 32 with respect to which the access right has been changed by referring to the electronic document data 30. In this case, it is desirable to reflect the change (editing result) in the electronic document data 30 (another document element).

However, it is too much for a user to reflect the editing result in the metadata of another document element entirely manually, and the omission of the reflection may result in a problem.

According to this embodiment, when metadata is edited, the result of the editing may be reflected automatically by the metadata editing part 24 (FIG. 1). The range of reflection destinations for the reflection by the metadata editing part 24 is determined based on the identification information contained in the metadata, and the reflection target is limited to a document element in a parent-child relationship (with a document element of the edited metadata).

It depends on a data item of metadata whether it is desirable to reflect the editing result for both, only one, or neither of the superordinate document element and the subordinate document element.

According to this embodiment, the document element for which the editing result is to be reflected is determined on a metadata item basis (metadata item by metadata item) based on a reflection destination specification table 50 (FIG. 9), which may be contained in the storage part 14. The reflection destination specifying part 25 (FIG. 1) determines the range of document elements for which the editing result of metadata is reflected based on this reflection destination specification table 50. The metadata editing part 24 reflects the editing result based on the determination (range determined) by the reflection destination specifying part 25.

The reflection destination specification table 50 may be edited by a user through, for example, the user interface part 20. This allows a user to determine (select) a document element for which the editing result is to be reflected (or recorded) or not to be reflected on a metadata item basis.

FIG. 9 illustrates the reflection destination specification table 50 including metadata and reflection destinations. FIG. 9 illustrates the case of causing a user to determine (select) the range of the metadata (items) of each of an electronic document, page, and partial image in which the editing result is to be reflected.

The reflection destination specification table 50 includes a data column 51, a data item column 52, and a change-time reflection destination column 53. The data item column 52 includes multiple data items of metadata. The data items are correlated with the corresponding document elements shown in the data column 51 so that the document element of the metadata related to the data items can be found. A list of document elements of an electronic document, page, and partial image for which a reflection destination can be specified is shown in the change-time reflection destination column 53.

Further, in the change-time reflection destination column 53, the document elements shown as reflection destinations at the time of a change or alteration (change-time reflection destinations) are correlated with individual data items so that it can be found on a data item basis which document element a change-time reflection destination is to be specified for. Thus, the reflection destination, or which document element a change to the values of the metadata of another document element is to be reflected for, can be specified.

Further, with respect to a change to a data item of a document element, a user may determine whether to reflect the change to the corresponding data item of another document element by specifying a circle (that is, "to be reflected") or cross (that is, "not to be reflected") in the field of the other document element on the same line as the changed data item in the change-time reflection destination column 53. Thereby, the user can easily specify the reflection destination of the other document element in which the change to the data item is to be reflected.

For example, FIG. 9 shows that a change to a data item 54 of ACCESS RIGHT of the page is reflected in the electronic document and the partial image and a change to a data item 55 of PAGE ID of the page is reflected only in the electronic document. Thus, the reflection destination is transparent to a user because the reflection destination can be changed in the metadata.

Further, it is possible to prevent a problem in that a subordinate document element can be accessed by accessing its superordinate document element when a change to a security-related metadata item such as access right is reflected only in the subordinate document element and is not reflected in the superordinate document element.

In the reflection destination specification table 50 of FIG. 9, a circle indicates "to be reflected," a cross indicates "not to be reflected," and a dash indicates "not related." This reflection in other document elements may take different forms such as a reflection in the superordinate document element and a reflection in the subordinate document element, thus varying depending on the purpose of use by a user. Example cases of this reflection may be as follows.

(a) A reflection in the superordinate document element is OK (circle), and a reflection in the subordinate document element is OK (circle).

This may apply to, for example, the case of a metadata item substantially included in the superordinate document element and the subordinate document element.

(b) A reflection in the superordinate document element is not OK (cross), and a reflection in the subordinate document element is OK (circle).

This may apply to, for example, the case of information (metadata item) related to the subordinate document element, such as information used for a link to the subordinate document element.

(c) A reflection in the superordinate document element is OK (circle), and a reflection in the subordinate document element is not OK (cross).

This may apply to, for example, the case of a metadata item included in the superordinate document element, such as a keyword (tag).

(d) A reflection in the superordinate document element is not OK (cross), and a reflection in the subordinate document element is not OK (cross).

This may apply to, for example, the case of a metadata item that does not affect other document elements, such as the repository of a document element.

Thus, a description is given above of examples of user purposes of reflecting a change to metadata in (the metadata of) another document element.

Next, a description is given below of a process for editing metadata through a user interface and causing a change to the metadata to be reflected in the metadata of another document element.

FIG. 10 is a sequence diagram illustrating a process for selecting a partial image and changing access right through a user interface.

In step S101 of FIG. 10, the user interface part 20 receives a search request for partial images specified by a user. In step S102, the search part 22 receives the partial image search request received by the user interface part 20.

In step S103, the search part 22 searches the storage part 14, where images are stored, for the partial images specified in the search request. In step S104, the search part 22 retrieves a list of the partial images obtained by the search of step S103. In step S105, the partial image list retrieved by the search part 22 is displayed as a search result on the user interface part 20.

In step S106, a partial image is selected from the partial image list displayed on the user interface part 20. At this point, in step S107, a change to the data item of ACCESS RIGHT in the metadata of the selected partial image is also received. In step S108, the metadata editing part 24 edits the metadata of the selected partial image based on the change to the data item of ACCESS RIGHT of the partial image received on the user interface part 20.

In the case of causing the change to the data item of ACCESS RIGHT made in the metadata editing part 24 to be reflected in the metadata of other document elements, in step S109, the reflection destination specifying part 25 is caused to specify a reflection range. In step S110, the metadata editing part 24 receives the reflection range specified by the reflection destination specifying part 25. In step S111, the metadata editing part 24 searches the storage part 14 for the document elements (for which the change is to be reflected) included in the reflection range specified by the reflection destination specifying part 25. In step S112, the metadata editing part 24 changes or updates the data items of ACCESS RIGHT in the metadata of the document elements retrieved from the storage part 14 based on the change to the data item of ACCESS RIGHT in the metadata of the selected partial image. Thus, the change is reflected in the metadata of the document elements retrieved from the storage part 14.

Figure 11:
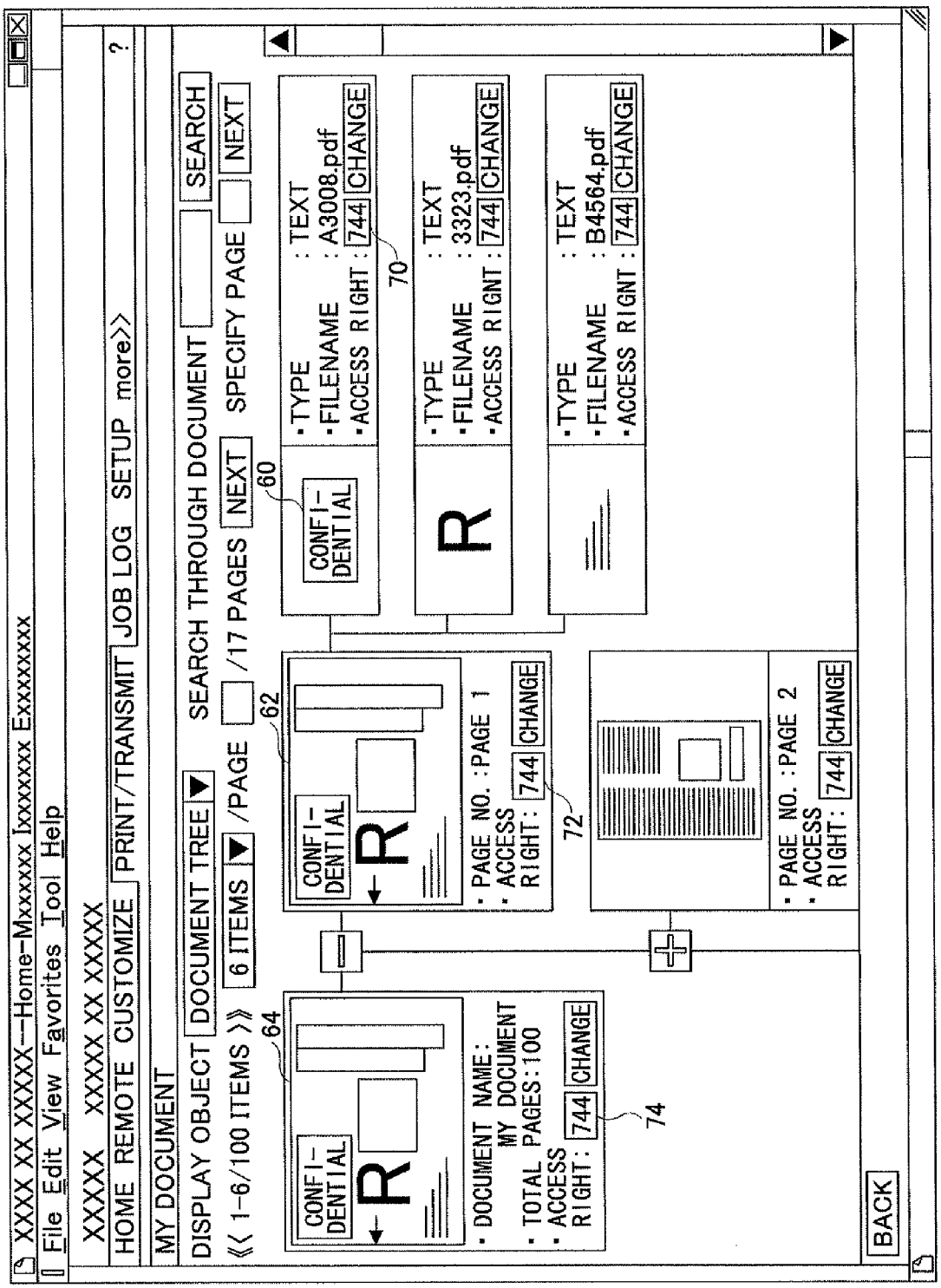
FIG. 11 is a diagram illustrating the user interface before changing the access right according to the embodiment of the present invention.
Figure 12:
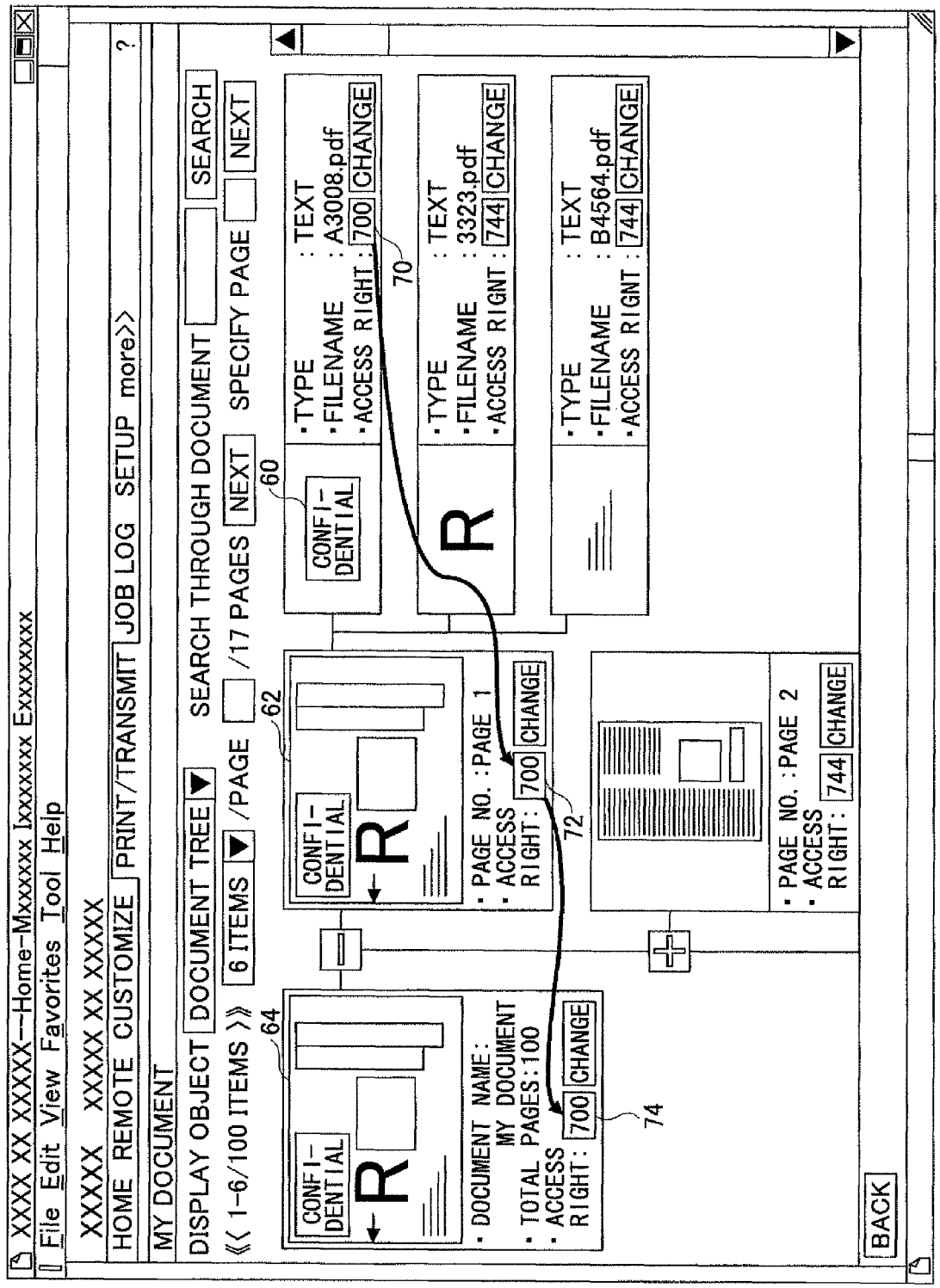
FIG. 12 is a diagram illustrating the user interface after changing the access right according to the embodiment of the present invention.

FIG. 11 is a diagram illustrating a user interface before changing access right. FIG. 12 is a diagram illustrating the user interface after changing access right. For example, in the user interface before changing access right, a partial image 60 is obtained (displayed) and the document elements related to this partial image 60 are called (displayed) as illustrated in FIG. 11. In the user interface after changing access right illustrated in FIG. 12, a change has been made to access right 70 of this partial image 60, and the change is reflected (recorded) in access right 72 of a page 62 and access right 74 of an electronic document 64, where the page 62 and the electronic document 64 are the document elements included in the reflection range specified by the reflection destination specifying part 25.

Referring back to FIG. 10, in step S113, the changed or updated access rights in the metadata of the document elements edited in the metadata editing part 24 are stored in the storage part 14. In step S114, the changed or updated access rights in the metadata of the document elements edited in the metadata editing part 24 are displayed on the user interface to show the reflection result.

Figure 13:
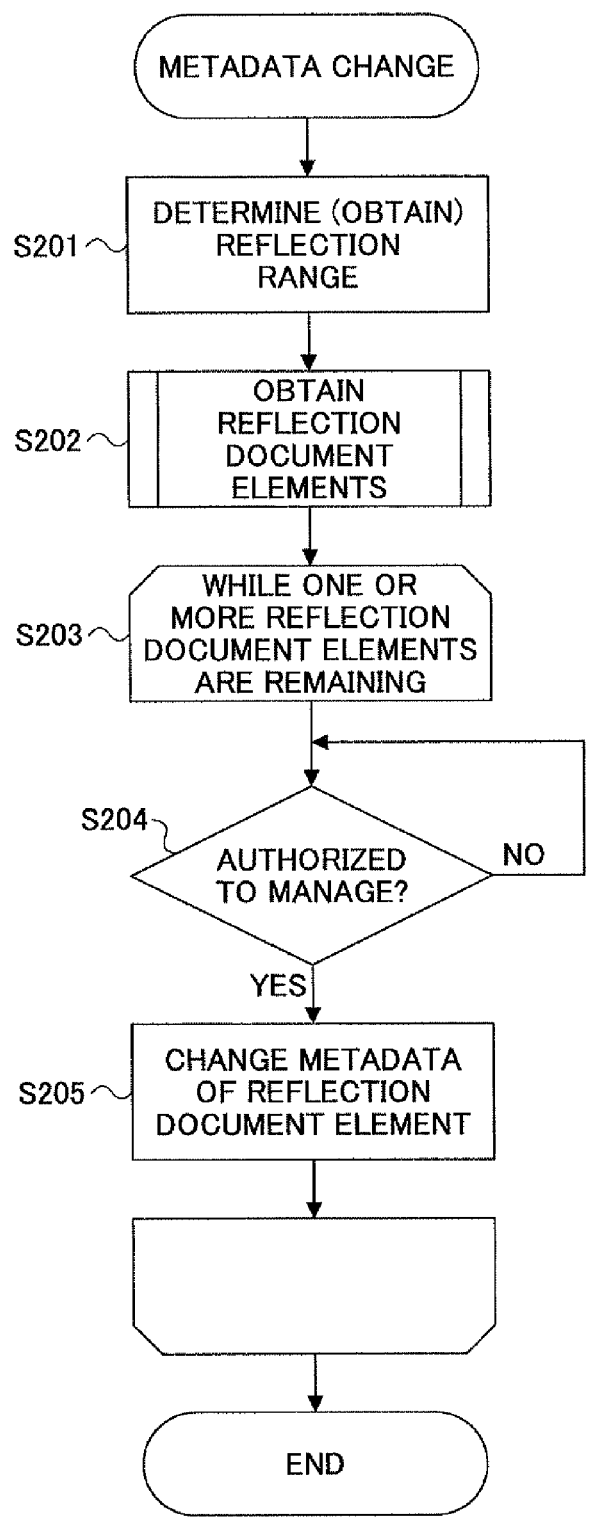
FIG. 13 is a flowchart illustrating a processing flow at the time of a metadata editing part changing metadata when a user selects a partial image on the user interface and changes or updates its access right according to the embodiment of the present invention.

Next, a description is given, with reference to FIG. 13, of a processing flow at the time of the metadata editing part 24 changing metadata when a user selects a partial image on the user interface and changes or updates its access right.

In step S201, the reflection destination specifying part 25 determines a reflection range based on a specification for reflecting the change to access right made in the metadata editing part 24 in the metadata of other document elements. In step S202, the reflection destination specifying part 25 obtains the document elements (reflection document elements) for which the change to the metadata is to be reflected. Then, in step S203, the operation of changing, or updating, the metadata of the reflection document elements is performed until the change is reflected, or recorded, in the metadata of all of the reflection document elements.

In step S204, the metadata editing part 24 determines whether it is authorized to manage the reflection document element. If the management of the reflection document element is authorized (YES in step S204), in step S205, the metadata editing part 24 reflects the change in the metadata of the reflection document element. If the management of the reflection document element is not authorized (NO in step S204), the processing returns to step S203 without reflecting the change in the reflection document element. When it is determined that the change is reflected in the metadata of all of the (manageable) reflection document element, the processing ends.

Figure 14:
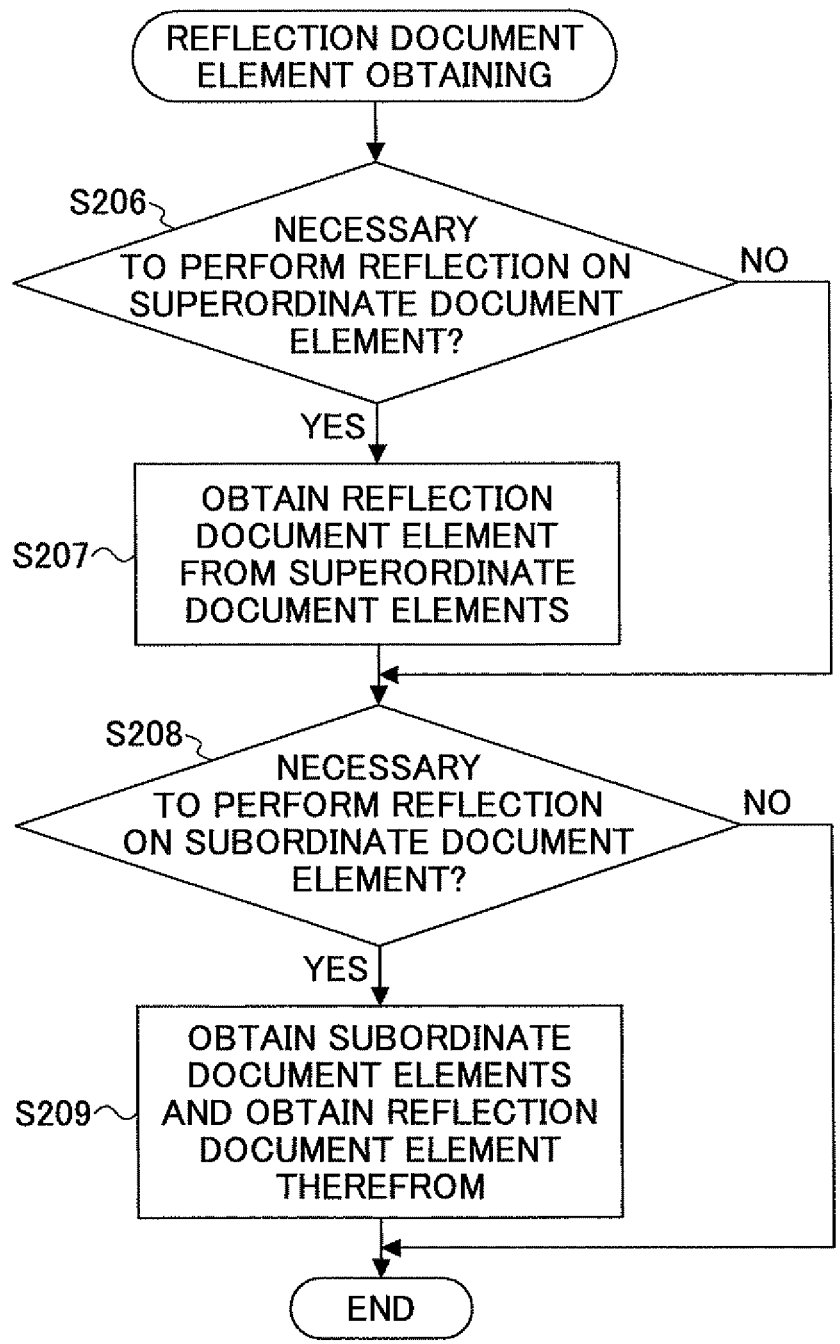
FIG. 14 is a flowchart illustrating a flow at the time of obtaining a reflection document element according to the embodiment of the present invention.

Further, a description is given, with reference to FIG. 14, of a process flow at the time of obtaining the reflection document elements (in step S202 of FIG. 13).

First, in step S206, it is determined whether it is necessary to reflect the change in the metadata of superordinate document elements. If it is necessary (YES in step S206), in step S207, the superordinate document elements are obtained, and one or more reflection document elements for which the reflection is to be performed are obtained from the obtained superordinate document elements.

If it is not necessary to reflect the change in any superordinate document element (NO in step S206), in step S208, it is determined whether it is necessary to reflect the change in the metadata of subordinate document elements. If it is necessary (YES in step S208), in step S209, the subordinate document elements are obtained, and one or more reflection document elements for which the reflection is to be performed are obtained from the obtained subordinate document elements. If it is not necessary to reflect the change in any subordinate document element (NO in step S208), the processing ends.

FIG. 15 is a block diagram illustrating a hardware configuration of the image processor 26.

Referring to FIG. 15, the image processor 26 includes a control part 261, an input unit 262, a storage unit 263 (corresponding to the storage part 14 of FIG. 1), a memory unit 264, a drive unit 265, and the display unit 266, which are interconnected with a bus B. The control part 261 may be a central processing unit (CPU), a microprocessor, or a microcontroller, and controls the operation of the information processor 26. The control part 261 executes programs contained in the storage part 263. Each of the input unit 262 and the display unit 266, which may include key switches (hard keys) and/or a liquid crystal display (LCD) having a touch panel function (including the software keys of a graphical user interface

[GUI]), is a display and/or input unit that serves as a UI in using the functions of the image processor 26. The storage unit 263 may be, for example, a hard disk drive (HDD). The memory unit 264 may include a read-only memory (ROM) and a random-access memory (RAM).

The image (information) processing method illustrated above according to this embodiment may be implemented as a computer program executed by the control part 261 of the image processor 26. Further, the computer program may be contained in the ROM or HOD (recording medium) of the image processor 26 so as to be read out and executed by the control part 261.

The computer program that causes the image processor 26 (control part 261) to execute the above-described processing may be recorded in an external recording medium 1000. Examples of the recording medium 1000 include optical, magnetic, or electric recording media such as SD cards, CD-ROMs, DVD-ROMs, and MOs. In this case, the program of the recording medium 1000 may be loaded into, for example, a memory such as a RAM through the drive unit 265 in the image processor 26 to be read and executed.

Thus, implementation of this embodiment enables a user to easily understand the configuration of an electronic (digitized) document, and makes it possible to provide an information processor and an information processing method with improved document management performance and a computer-readable recording medium on which a program for causing a computer to execute the information processing method is recorded.

According to this embodiment, when metadata are edited or updated, the result of the editing or updating is reflected in the metadata of another document element. As a result, an addition or change to or deletion of data from the metadata of one document element can be easily reflected, or recorded, in the metadata of another document element with consistency without forcing unnecessary work on a user. Further, since the reflection range may be limited to a parent-child relationship, the reflection can be performed on document elements without causing a user to select an unintended reflection destination.

Further, according to this embodiment, a reflection document element, or a document element for which a change in the metadata of another document element is to be reflected, is specified based on the reflection destination specification table 50. Since the range of specification of the reflection destination specification table 50 may be within the range of a parent-child relationship, the reflection document element is easily understandable to a user who is going to select a reflection destination, and it can be less likely that the user selects a wrong reflection destination. Further, since a user can edit the reflection destination specification table 50, customization can be performed easily from the reflection destination specification table 50 on a user basis (user by user). This can save unnecessary work and improve working efficiency.

The present invention is not limited to the specifically disclosed embodiment, and variations and modifications may be made without departing from the scope of the present invention.

For example, according to this embodiment, the storage part 14 that stores image data and metadata is provided in the image processor 26. The present invention, however, is not limited to this configuration, and the storage part 14 may be provided in another image processor connected to the image processor 26 via a communications line or network or be a storage medium attachable to and detachable from the image processor 26, such as an SD card.

Thus, according to one aspect of the present invention, the result of editing or updating the metadata of one document element is reflected (recorded) easily in the metadata of another document element, so that a user's working efficiency is improved.

Further, according to this embodiment, a description is given of reflection of the result of editing the metadata of electronic document data, page image data, and partial image data. The present invention, however, is not limited to this configuration, and is also applicable to the configuration where the result of editing the metadata of one of interrelated contents is reflected in the metadata of the other one of the interrelated contents. Examples of contents include music contents containing audio data and book contents containing text data as novels.

A description is given below of this embodiment in the case of using music contents.

It is assumed that multiple music contents are contained in an information processor such as a personal computer or a music player and there is a correlation between music contents. For example, music contents may be correlated by being contained in the same folder or be correlated through metadata.

This correlation may be made manually by a user or made automatically in the information processor or by a server from which the contents are downloaded. In this case, if a user edits the metadata of a first content, such as an artist name or song title, the information processor reflects, or records, the result of the editing in the metadata of a second content related to the first content. This makes it unnecessary for a user to edit metadata content by content, thus improving working efficiency.

The information processor and information processing method according to this embodiment are also applicable to personal computers such as desktop personal computers and notebook personal computers and image forming apparatuses such as facsimile machines, copiers, and multifunction machines.

What is claimed is:

1. An information processor, comprising:
a processor configured to execute a program to implement:
a storage part configured to store an electronic document data element, a page image data element subordinate to the electronic document data element, and a partial image data element subordinate to the page image data element, wherein the electronic document data element is content data of an electronic document, the page image data element is content data of an image of a page of the electronic document, and the partial image data element is content data of a part of the image of the page of the electronic document;
a metadata storage part configured to store metadata of each of the electronic document data element, the page image data element, and the partial image data element, and identification information for identifying a relationship between the electronic document data element, the page image data element, and the partial image data element, wherein the metadata storage part stores a reflection destination specification table comprising the metadata which includes access rights for the electronic document data element, the page image data element and the partial image data element;
an editing part configured to permit a user to edit the access rights in the reflection destination specification table;

a reflection part configured to reflect a result of editing the access rights of one or the electronic document data element, the page image data element, and the partial image data element by the editing of the access rights of at least one of the remaining elements of the electronic document data element, the page image data element, and the partial image data element based on the edits to the access rights in the reflection destination specification table, wherein the electronic document data element, the page image data element, and the partial image data element have the same identification information included in the respective metadata.

2. The information processor as claimed in claim 1, wherein the reflection part is configured to determine a range for which the result of editing the access rights of the one of the elements of content data is reflected from the remaining elements of the electronic document data element, the page image data element, and the partial image data element based on the identification information.

3. The information processor as claimed in claim 1, wherein the processor is configured to executed the program to further implement:

a reflection destination specifying part configured to specify, in response to the editing part editing a value of one of a plurality of data item of the access rights, at least one of the electronic document data element, the page image data element, and the partial image data element to have the result of the editing by the editing part reflected in the corresponding access rights with respect to the one of the data item of the access rights.

4. The information processor as claimed in claim 3, wherein the reflection part is configured to reflect the result of the editing by the editing part based on a result of the specifying by the reflection destination specifying part.

5. The information processor as claimed in claim 1, wherein the editing part is configured to add, change, or delete a value of a data item of the access rights.

6. An information processing method, comprising the steps of:

(a) storing, performed by a computer processor, an electronic document data element, a page image data element subordinate to the electronic document data element, and a partial image data element subordinate to the page image data element, wherein the electronic document data element is content data of an electronic document, the page image data element is content data of an image of a page of the electronic document, and the partial image data element is content data of a part of the image of the page of the electronic document;

(b) storing, performed by the computer processor, metadata of each of the electronic document data element, the page image data element, and the partial image data element, and identification information for identifying a relationship between the electronic document data element, the page image data element, and the partial image data element, wherein the metadata storage part stores a reflection destination specification table comprising the metadata which includes access rights for the electronic document data element, the page image data element and the partial image data element;

(c) editing, performed by the computer processor, the access rights, by permitting a user to edit the access rights in the reflection destination specification table;

(d) reflecting, performed by the computer processor, a result of editing the access rights of one the electronic document data element, the page image data element, and the partial image data element by the editing of the access rights of at least one of the remaining elements of the electronic document data element, the page image data element, and the partial image data element based on the edits to the access rights in the reflection destination specification table, wherein the electronic document data element, the page image data element, and the partial image data element have the same identification information included in the respective metadata.

7. The information processing method as claimed in claim 6, wherein said step (d) determines a range for which the result of editing the access rights of the one of the elements of the electronic document data element, the page image data element, and the partial image data element based on the identification information.

8. The information processing method as claimed in claim 6, further comprising the steps of:

(e) specifying, performed by the computer processor, in response to editing a value of one of a plurality of data item of the access rights in said step (c), at least one of the electronic document data element, the page image data element, and the partial image data element to have the result of the editing in said step (c) reflected in the corresponding access rights with respect to the one of the data item of the access rights.

9. The information processing method as claimed in claim 8, wherein said step (d) reflects the result of the editing in said step (c) based on a result of the specifying in said step (e).

10. A non-transitory computer-readable recording medium on which a program for causing a computer to execute the information processing method as claimed in claim 6 is recorded.

* * * * *